March 16, 1954 A. WRIGHT 2,672,606

PLEOCHROIC TELEVISION PROCESS AND APPARATUS

Filed March 24, 1950

2 Sheets-Sheet 1

INVENTOR

Arthur Wright

March 16, 1954 A. WRIGHT 2,672,606

PLEOCHROIC TELEVISION PROCESS AND APPARATUS

Filed March 24, 1950

2 Sheets-Sheet 2

INVENTOR

Arthur Wright

Patented Mar. 16, 1954

2,672,606

UNITED STATES PATENT OFFICE 2,672,606

PLEOCHROIC TELEVISION PROCESS AND APPARATUS

Arthur Wright, Forest Hills, N. Y., assignor to William E. Celestin, New York, N. Y.

Application March 24, 1950, Serial No. 151,711

1 Claim. (Cl. 340—369)

My invention relates particularly to a process and apparatus for transmitting and receiving visual images electronically.

An object of my invention is to provide a process and apparatus for transmitting and receiving images in colors which preferably are natural and accurately reproduced. This is accomplished in accordance with my invention, by dividing the images to be transmitted into components of the different colors thereof which are individually transmitted and thereafter received by means of electrical impulses which are translated by fluorescence into light having components corresponding to those originally transmitted. The images thus produced by the visual blending of said colors may be viewed either directly on the surface of the picture tube in which the images are received, or, if desired, the images may be viewed by optical projection onto another, different or larger viewing surface or screen. A further object is to attain accuracy by having incorporated in the apparatus accurately matched color mosaic plates, both with the camera tube and with the picture tube or kinescope.

Further objects of my invention will be apparent from the detailed description of the same hereinafter.

While my invention is capable of embodiment in many different forms, for the purpose of illustration I have shown and described only certain embodiments thereof hereinafter in connection with the accompanying drawings, in which—

Figures 1, 2:
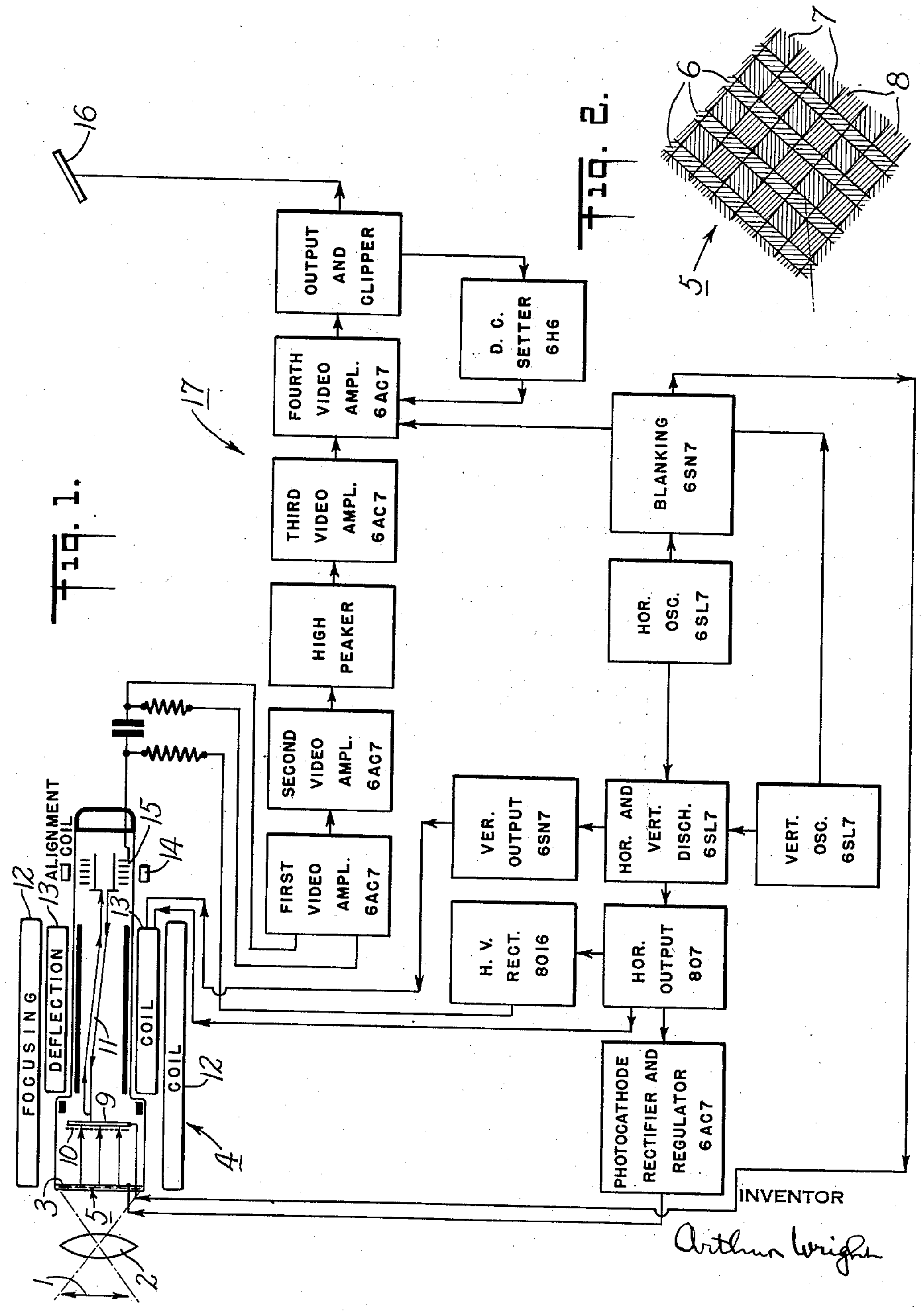
Fig. 1 is a diagrammatic representation of an image orthicon tube, or other television camera tube, and the circuits which may be used therewith in sending or transmitting the video signals of images to be reproduced at the receiving end of the system.
Fig. 2 is a diagrammatic representation, enlarged, of a pleochroic mosaic color plate used with the camera tube, which may have either a flat or curved light-receiving face.

Referring to the drawings, I have shown a color television system comprising a scene 1 which is to be transmitted, an image of which is thrown by any desired objective 2 onto a photo cathode 3, having on its right face innumerable silver-cesium photo-electric material particles, of an image orthicon 4 or any other type of camera tube, the said orthicon being of the well known type except that on the outside or inside of the left light receiving face of the tube 4 in front of the photo cathode 3, or on the left face of the photo cathode 3, there is provided a microscopic color pattern mosaic 5. This may be, preferably, comprised geometrically of a series of parallel angularly or diagonally located red lines 6, between which there are located a succession of alternating blue areas 7 and green areas 8. It will be noted that, preferably, any one 3-color sequence of red, blue and green areas is not horizontal but inclined so as to be slightly higher at either end, compared to the inclination of the usual electron scanning lines, when viewing the positions of the scanning lines and color areas from the same viewpoint, for instance from the outside of the tube 4. The depths and shade of color and areas of these color elements are such that, preferably, together they produce white light, although any other colors may be used, if desired.

Figures 3, 4:
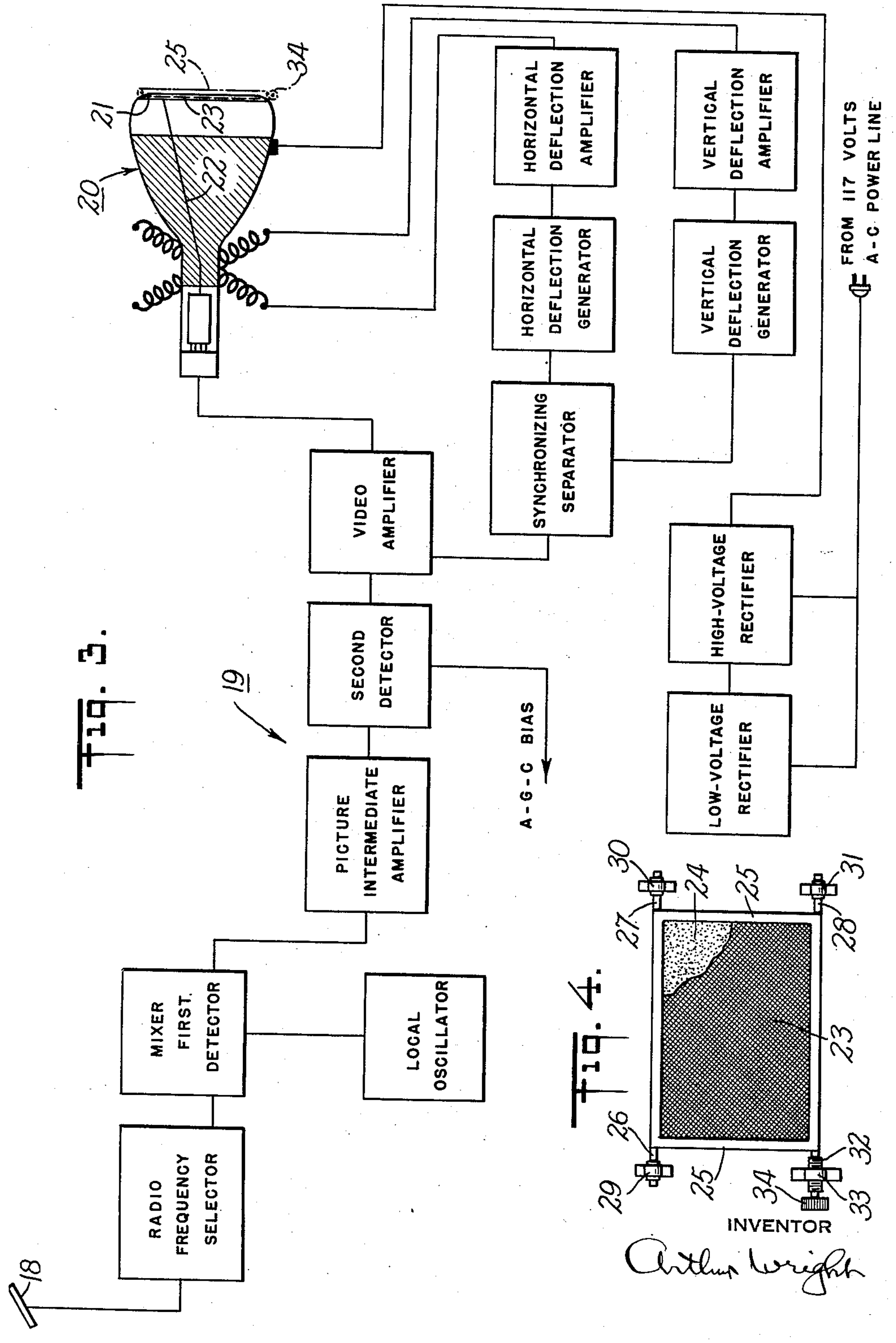
Fig. 3 is a diagrammatic representation of the picture tube which may have either a flat or curved viewing face, and the circuits which may be used therewith.
Fig. 4 is an elevation of a horizontally adjustable color mosaic screen which may, if desired, be located in front of the picture tube.

This color pattern for mosaic 5, thus, has the separate three or more color areas 6, 7 and 8, which are approximately rectangular in shape and which may be produced in any desired way, for instance as in making color mosaic photograph screen plates for reproducing color images photographically. The individual colors or pigments may be of any desired and known coloring materials, whether of a mineral or organic nature, as for instance coal tar or synthetic dyestuffs, or transparent mineral compounds such as those which may be made in producing synthetic or artificial gems, which are generally silicates or oxides of aluminium or other materials and which ofttimes carry the necessary small proportions of mineral impurities producing the respective desired colors, as in the case of gems. If desired, an adhesive or carrier for the pigments may be used, which is preferably transparent and colorless, as for instance a plastic or sodium silicate or potassium silicate. The color mosaic 5 is located on the left face of, or as near as possible to, the photo cathode 3 with which it may be in contact, if desired, on the inner face of the glass wall of the orthicon or other camera tube 4, or it may be on the outside of said glass wall. When the color mosaic is carried on the left face of the photo cathode 3 there may be applied thereto a protective layer or coating of any desired kind, as for instance a thin glass plate or sodium silicate or potassium silicate, which protects and separates the rays and ions which may be present in the evacuated space in the tube 2 from contact with the color mosaic 5. The respective different color elements 6, 7 and 8 may be of any desired dimensions, for instance with a width of 3 to 30 per mm., or even a much greater width than said 3 to 30 per mm. if the received image is not enlarged by projection. The light received from the objective 2 through the color pattern 5 is thus received by the photo cathode 3 and as a result corresponding electrons are projected onto a target plate 9 having the usual secondary-electron collecting wire screen 10 located in front thereof so that the electrical image which is thus produced on the right side of the target plate 9 is scanned by an electron scanning beam 11 in the usual way, transmitted through the camera tube 4 with the aid of a focussing coil 12, a deflection coil 13 and an alignment coil 14 so that the resultant variations in the current, after passing through a five-stage electron multiplier section 15, are transmitted to a broadcasting aerial 16 with the aid of any desired circuits 17 which may, for example, be arranged as provided in Grob, Basic Television, McGraw-Hill Book Company, 1949, and particularly page 513 thereof. The broadcast television signals are thence received by an aerial 18 and conveyed by any desired receiving set circuits 19, such for example as provided in Grob, ibid., and particularly page 128 thereof, to a kinescope or picture tube 20 of any desired character, such for instance as one of those in Grob, ibid., on page 42 or page 128, or the flat faced picture tube such as on page 149 thereof. Said picture tube 20 has on the inner face or wall thereof a layer or coating of any desired fluorescent material 21, such for instance as, preferably, cadium tungstate which produces white light when acted upon by an electron scanning beam 22 of said picture tube. Between the fluorescent coating 21 and the glass wall of the picture tube 20, the color mosaic being thus protected, from the electrons and ions that may be present, by the fluorescent coating 21, or on or associated with the front face or viewing surface of the picture tube 20, there is provided another color mosaic 23 constructed in substantially the same way and with the same color pattern as described hereinabove, taking into account the relative sizes of the image on the photo cathode 3 and the picture tube image, shown in Fig. 2, so that the color elements in the mosaic 23 will be larger or smaller than the color elements in the screen 5, according to the relative sizes of the photo cathode image and the picture tube image. If desired, this color mosaic 23 may be in the form of a movable screen, as shown in Fig. 4, in which the color mosaic is carried by any desired supporting layer 24, such for instance as of gelatine which is carried within a shiftable frame 25 having three guide rods 26, 27 and 28 slidably carried in brackets 29, 30 and 31 supported by the television receiving set closely adjacent to the front of the picture tube 20. A fourth rod 32, with its inner end rotatably carried in the frame 25, is screw-threaded within a similar supporting bracket 33, and has a rotatable thumb-screw head 34 thereon, so that by turning the head 34 the position of the screen 23 may be adjusted laterally across the face of the tube 20 to set or change the registry of the screen elements with the color picture elements transmitted from the camera tube.

In carrying out the operation of my process, the subject to be transmitted, for instance a stage scene, will be focussed by the objective 2 onto the photo cathode 3 through the color mosaic 5, as a result of which the photo cathode 3 projects electrons at right angles thereto onto the target 9 through the wire screen 10, which vary according to the intensity of the light received by the different areas of the photo cathode in relation to the intensity of the light received through the respective color elements of the color mosaic 5. The impulses thus produced are transmitted by the aerial 16 and picked up by the receiving aerial 18 to be conveyed, with the aid of the circuits 19, to the picture tube 20 where the electron scanning beam 22 scans the surface of the fluorescent material 21, thus forming light rays that pass through the color mosaic 23 located in a correct or accurately adjusted position corresponding exactly to the respective color elements of the color mosaic 5 in the camera tube 4. From time to time, if desired, the color screen 23 may be given any fine degrees of adjustment to make its position exactly accord with the scanning beam 22 and the elements of the color mosaic 5 in the camera tube. As the respective sets of monochrome colors of the two color mosaics 5 and 23 are at the same angle to the horizontal, a lateral adjustment of the color mosaic 23 will suffice for this purpose. In this way, the televised subjects observed through the color mosaic screen 23 reproduce the colors received by the camera tube 2 without the need of an intervening projection lens, although, of course, it will be understood that the image thus transmitted through the color mosaic screen 23 may be thrown onto any other or larger viewing screen or surface, if desired, by means of any desired projection system. In this way, camera tubes and picture tubes, such as have been previously known, can be readily modified merely by applying thereto or using therewith color mosaics or screens.

While I have described my invention above in detail, I wish it to be understood that many changes may be made without departing from the spirit of the same. For instance, it will be understood that many other types of camera tubes or picture tubes or both may be used therewith. Furthermore, any other fluorescent materials producing white or colored light, as desired, may be utilized in the picture tubes. Also, any desired combination or set of color elements may be used with two or more colors in the color mosaics 5 and 23, and the color areas thereof may be of any desired shape or size. Also, the angles of the respective sets of monochrome colors in the color mosaics 5 and 23 may be chosen or altered so as to be the same as the respective angles of the scanning electron beam lines, although it is preferable for the said angles to be different, as pointed out above.

I claim:

A television picture tube apparatus having a fluorescent surface in the tube and a stationary color filter comprising a plural color mosaic surface located outside said tube capable, while in a stationary position, of transmitting light in a succession of different colors from said fluorescent surface, the plural color mosaic surface being in the form of a screen horizontally adjustable into a fixed position with regard to the picture tube, the plural color mosaic being in a geometrical pattern with the respective sequences of rectangular monochrome colors being located in lines inclined to substantially horizontal scanning beam lines.

ARTHUR WRIGHT.

References Cited in the file of this patent

UNITED STATES PATENTS

| Number | Name | Date |
|---|---|---|
| 2,296,908 | Crosby | Sept. 29, 1942 |
| 2,389,979 | Huffnagle | Nov. 27, 1945 |
| 2,452,293 | De Forest | Oct. 26, 1948 |
| 2,479,820 | De Vore | Aug. 23, 1949 |
| 2,480,848 | Geer | Sept. 6, 1949 |
| 2,493,200 | Land | Jan. 3, 1950 |
| 2,508,267 | Kasperowicz | May 16, 1950 |

FOREIGN PATENTS

| Number | Country | Date |
|---|---|---|
| 589,345 | Great Britain | Oct. 22, 1945 |